March 18, 1969   G. CAVALIER   3,433,059

COUPLING MEMBER FOR ULTRASONIC SCANNING DEVICE

Filed Dec. 27, 1965

INVENTOR:
GILBERT CAVALIER
BY Kurt Kelman
Agent

United States Patent Office 3,433,059
Patented Mar. 18, 1969

3,433,059
COUPLING MEMBER FOR ULTRASONIC SCANNING DEVICE
Gilbert Cavalier, Saint-Germain-en-Laye, France, assignor to Institut de Recherches de la Siderurgie Francaise, Saint-Germain-en-Laye, Yvelines, France
Filed Dec. 27, 1965, Ser. No. 516,224
Claims priority, application France, Dec. 31, 1964, 517
U.S. Cl. 73—71.5    6 Claims
Int. Cl. G01n 29/04

ABSTRACT OF THE DISCLOSURE

An ultrasonic testing device has a coupling member carrying a transducer on a flat face obliquely inclined to another flat face of the coupling member normally in contact with the tested object. A third face is cylindrical about an axis parallel to the first and second faces, the axis being far enough from the contact face to be outside the radiation emitted from the transducer parallel to the contact face. The contact face is tangential to the third face and prevents the formation of spurious signals which would be caused by an angular ridge at the contact face opposite the transducer.

---

This invention relates to the ultrasonic testing of sheet metal and like thin objects, and particularly to a scanning arrangement for testing foils and the like.

When Lamb's waves are employed for detecting defects in thin sheet metal, it is necessary to use a transducer which has a piezoelectric surface inclined at a predetermined angle to the surface of the object to be tested. It is common practice to interpose a solid body having the shape of a triangular prism or wedge between the emitting surface of the transducer and the surface of the sheet object tested which is moved along a surface of the wedge.

Parasitic reflections from the internal surfaces of the wedge, however, produce disturbances. At least some rays in the divergent beam emitted by the transducer are reflected only a few times within the wedge before being returned to the transducer to produce spurious signals, the attenuation being practically proportional to the number of reflections and almost independent of the length of material passed by the beam because of the small dimensions of the wedge. The shortest ray path is only twice the length of the wedge for 180° reflection at the ends of the wedge.

If defects are to be detected in a strip of sheet metal of great width, one may disregard the disturbed region which includes the surface occupied by the wedge ("dead zone") and the zone in which parasitic echoes are produced because the ratio $R_s$ of the width which can usefully be scanned to the width of the disturbed region is great. However, if a narrow foil is to be tested, the use of a wedge reduces $R_s$ to small values and even to one; the disturbed region covers practically the entire surface to be scanned, and the signals which appear on an oscillogram cannot be used for locating defects since it is not known whether they are caused by parasitic echoes or by material defects.

The object of the invention is the provision of a scanning arrangement which overcomes the limitations of the known wedge-type arrangements.

Another object is the provision of a solid coupling member to be interposed between the transducer of the ultrasonic testing device and the surface of the object to be tested which causes parasitic echoes to undergo many internal reflections before being returned to the transducer so that they are attenuated to an extent which prevents them from interfering with the reading of defect signals.

It has been found that parasitic echoes are not produced from the face of a coupling member which is in engagement with the object to be tested and that radiation emitted toward that face is practically completely absorbed by he tested object, but come from the other faces of the wedge-shaped conventional coupling member. This observation has led to the instant invention, taking into consideration the following additional facts:

When an ultrasonic beam is reflected from a planar surface, its dispersion is not affected by the reflection, and its angle of divergence remains unchanged. The reflection of a beam from a curved surface, cylindrical or spherical, causes dispersion of the beam in an inverse relationship to the radius of curvature.

The coupling member of the invention, therefore, has a curved face opposite the face carrying the transducer. The flat base face of the coupling member is angularly offset from the transducer-carrying face and is made tangential to the curved face, the axis of curvature of the latter being placed sufficiently far from the base face so that all rays of the beam emitted from the transducer and parallel to the base face strike the curved face. It is important that the transition from the base face to the curved face be free of discontinuities, and there must not be a ridge where the contact face and the curved face meet since such a ridge would reflect a portion of the ray toward the transducer. The tangential relationship required for avoiding such a ridge makes it necessary that the curved face be cylindrical. Those portions of the beam emitted by the transducer which do not strike the object to be tested are thus reflected by the cylindrically curved face of the coupling member away from the base face and from the face carrying the transducer. The portion of the coupling member which receives the reflected beam portion from the cylindrically curved surface is shaped to cause multiple reflections and attenuation.

The exact nature of this invention and other objects and advantages thereof will become apparent from the following detailed description of a preferred embodiment when taken with the appended drawing in which.

Figure 1:
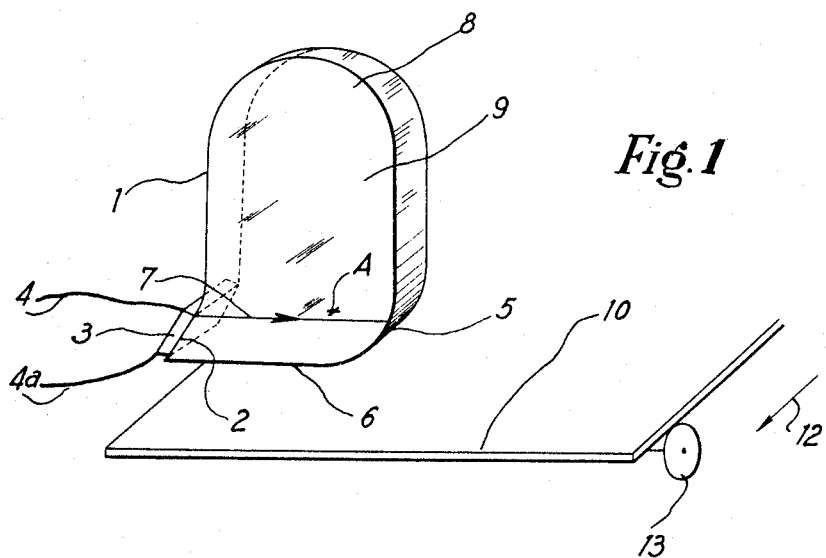
FIG. 1 shows a scanning arrangement of the invention in a perspective view.

Referring to FIG. 1 in detail, there is seen a coupling member 1 of the invention which is a unitary body of polymethyl methacrylate. A flat face 2 of the member 1 carries a transducer 3 which is adhesively fastened to the member 1. Leads 4, 4a connect the transducer to the electrical circuit of the testing apparatus, not otherwise shown, since it is not itself at the core of this invention. The base face 6 of the coupling member is also flat and meets the transducer-bearing face 2 at an acute angle as in a conventional wedge-type coupling member. The face 5 of the coupling member opposite the face 2 is cylindrical about an axis through A which is slightly farther from the base face 6 than any ray of radiation emitted from the transducer 3 in a direction parallel to the contact face 6, and indicated by an arrow 7 in FIG. 1.

The portion 8 of the coupling member opposite the base face 6 is semi-cylindrical in shape. The main portion 9 of the member contiguously adjacent the portion 8 is a rectangular parallelepiped which has two opposite faces tangential to the curved face of the portion 8, and one of these two faces is also tangential to the cylindrically curved face 5. Common parallel flat surfaces bound the semi-cylindrical portion 8, the parallelepiped portion 9 and the portion of the coupling member 1 which is otherwise bounded by the transducer-bearing surface 2, the base face 6 and the cylindrically curved face 5.

The base face 6 of the coupling member normally engages a foil 10 which travels in the direction of the arrow 12. The conveying mechanism, known in itself, which moves the foil 10 in engagement with the base face 6 has been largely omitted from the drawing for the sake of clarity, only a single roll 13 having been shown. The approximate dimensions of the illustrated device may be deduced from the drawing and from the fact that the width of the moving foil 10 is 150 mm.

Figure 2:
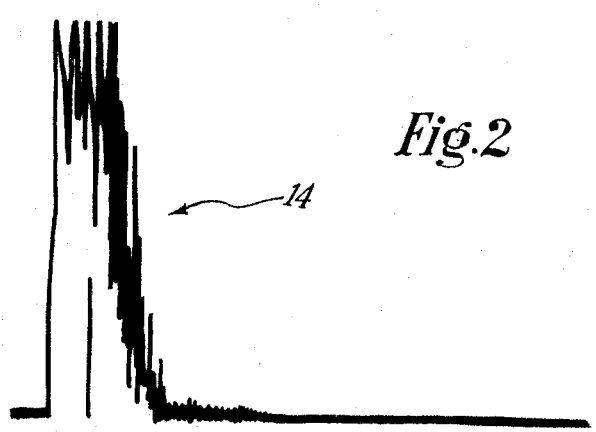
FIG. 2 shows an oscillogram obtained in a conventional manner from the scanning arrangement of FIG. 1.

FIG. 2 shows a typical oscillogram obtained with the scanning arrangement of FIG. 1. The oscillogram shows only the signal 14 due to the emitted pulse, but no parasitic reflections. The useful zone scanned by the arrangement includes even a portion of the material under the face 6. A ratio $R_s$ as high as 10 has been achieved with a coupling member having a base face of 30 mm. for scanning a foil 150 mm. wide. The disturbed zone thus was limited to 15 mm. With a conventional wedge-shaped coupling member, the disturbed region would have been about 60 mm. wide under otherwise comparable conditions, for an $R_s$ value of 2.5.

It has been found that useful readings can be obtained with the afore-described scanning arrangement on foil as narrow as 60 mm.

It should be understood, of course, that the foregoing disclosure relates only to a preferred embodiment of the invention and that it is intended to cover all modifications of the example chosen for the purpose of the disclosure which do not constitute departures from the spirit and scope of the invention defined in the attached claims.

What is claimed is:

1. In a scanning arrangement for ultrasonic testing of foil and like thin objects, the arrangement including a coupling body having a first flat face adapted to engage the object to be tested and a second flat face offset from said first face at an acute angle; and a transducer fixedly fastened to said second face for emitting ultrasonic radiation inward of said body and toward said first face, the improvement in the coupling body which comprises:
   (a) said body having a third convexly arcuate face,
   (b) said third face having an axis of curvature parallel to said first and second faces,
   (c) the spacing of said axis from said first face being greater than the corresponding spacing of all radiation emitted by said transducer in a direction parallel to said first face; and
   (d) said body having a fourth convexly arcuate face oppositely spaced from said first face,
   (e) said first face being tangential to said last face.

2. In an arrangement as set forth in claim 1, said body having a plurality of integral portions, a first portion being a rectangular parallelepiped, a second portion being of semi-cylindrical shape and superimposed on the first portion in such a manner that two opposite faces of the first portion are tangential to the curved face of said second portion, said curved face being said fourth face, and a third portion extending from said first portion away from said second portion, said third portion being bounded by said first, second, and third faces, one of said two opposite faces being tangential to said third face.

3. In an arrangement as set forth in claim 1, means for holding a foil and like thin objects in contact with said first face.

4. In an arrangement as set forth in claim 1, means for moving a foil and like thin object in a path parallel to said first face while in contact with said first face.

5. In an arrangement as set forth in claim 1, said third face being cylindrically curved about said axis.

6. In an arrangement as set forth in claim 5, said fourth face being semicylindrical.

References Cited

UNITED STATES PATENTS

| 2,683,821 | 7/1954 | Rocha. |
| 3,074,267 | 1/1963 | Martin _____ 73—67.5 |

FOREIGN PATENTS 783,965  10/1957  Great Britain.

RICHARD C. QUEISSER, *Primary Examiner.*

J. P. BEAUCHAMP, *Assistant Examiner.*

U.S. Cl. X.R.

73—67.8; 178—68; 307—290; 310—8.7; 328—118, 119; 340—347